United States Patent [19]

Menzel et al.

[11] 4,439,700
[45] Mar. 27, 1984

[54] MAGNETIC DRIVE SYSTEM FOR GENERATING LINEAR MOVEMENTS

[75] Inventors: Klaus Menzel; Ludwig Erd, both of Berlin; Marlene Marinescu, Frankfurt am Main, all of Fed. Rep. of Germany

[73] Assignee: Vacuumschmelze GmbH, Fed. Rep. of Germany

[21] Appl. No.: 352,325

[22] Filed: Feb. 25, 1982

[30] Foreign Application Priority Data

Mar. 21, 1981 [DE] Fed. Rep. of Germany ....... 3111222

[51] Int. Cl.³ ............................................. H02K 41/00
[52] U.S. Cl. ......................................... 310/13; 310/27
[58] Field of Search ...................................... 310/13, 27

[56] References Cited

U.S. PATENT DOCUMENTS

| | | | |
|---|---|---|---|
| 3,018,467 | 1/1962 | Harris | 310/27 |
| 3,129,347 | 4/1964 | Tognola | 310/15 |
| 3,417,268 | 12/1968 | Lace | 310/27 |
| 3,581,127 | 5/1971 | Wyke | 310/13 |
| 3,917,987 | 11/1975 | Inoue | 310/13 |
| 4,318,038 | 3/1982 | Munehiro | 310/27 |

FOREIGN PATENT DOCUMENTS

| | | | |
|---|---|---|---|
| 2409298 | 4/1975 | Fed. Rep. of Germany | 310/13 |
| 2939829 | 5/1980 | Fed. Rep. of Germany | . |
| 7019118 | 12/1971 | France | 310/27 |

Primary Examiner—Donovan F. Duggan
Assistant Examiner—Anita M. Ault
Attorney, Agent, or Firm—Hill, Van Santen, Steadman & Simpson

[57] ABSTRACT

A magnetic drive system for generating linear movements, such as for driving a printing element in a high speed printer, has a bar-shaped armature with a coil comovable attached thereto, the coil and armature combination being seated in a yoke for longitudinal movement relative thereto. The yoke and armature consist primarily of low magnetic retentive material and at least one permanent magnet is disposed in the magnetic circuit formed by the yoke and armature such that a magnetic flux is produced in the armature parallel to the longitudinal axis thereof. The coil is connected to a voltage source for operation such that current flow through the coil generates a field in the longitudinal direction of the armature which reinforces the attractive force of the magnetic field at one end of the armature while simultaneously reducing the force at the opposite end to thereby move the armature and coil together. The length of the yoke in the longitudinal direction of the armature is greater than the portion of the armature consisting of low magnetic retentive material.

6 Claims, 4 Drawing Figures

MAGNETIC DRIVE SYSTEM FOR GENERATING LINEAR MOVEMENTS

BACKGROUND OF THE INVENTION

1. Field of the Invention

The present invention relates to magnetic drive systems for generating linear movements, and in particular to such magnetic drive systems for use in operating a printing element of a high speed printer.

2. Description of the Prior Art

A magnetic drive system for a printing element of a high speed printer is disclosed in German OS No. 2,939,829 having an armature seated in a yoke for longitudinal movement relative thereto and at least one permanent magnet disposed in the magnetic circuit formed of the yoke and armature such that the magnet effects a magnetic flux in the armature which is directed from both ends of the armature to the center of the armature or vice versa. The yoke and armature consist primarily of material having a low magnetic retention. The yoke in this known system completely surrounds the armature and the magnets in the yoke are magnetized in the radial direction. Coils are disposed at both sides of the yoke for excitation in order to induce a flux which is superimposed on the flux generated by the permanent magnets such that the flux at one end of the yoke is amplified and is reduced at the opposite end. A force influencing the armature thus results which places the armature in motion in the longitudinal direction toward one of the coils. The magnetic forces resulting from the coil acting on the armature increase with increased movement of the armature. In addition to forces which ideally move the armature in the longitudinal direction relative to the yoke, considerable forces also act on the armature in the radial direction if the armature is not precisely centered in the yoke.

Because of the necessity to eliminate forces acting on the armature other than those forces which move the armature in a longitudinal direction, such conventional devices require that relatively expensive and time-consuming steps and structural outlay be utilized to precisely seat the armature in the yoke, therey adding to the overall cost of the drive system.

SUMMARY OF THE INVENTION

It is an object of the present invention to provide a magnetic drive system for moving an armature in a linear direction in which the force operating on the armature is largely independent of the amount of longitudinal movement of the armature and is essentially determined by the current in a single coil.

It is a further object of the present invention to provide such a magnetic drive system in which the seating or mounting of the longitudinal movable armature in the surrounding yoke requires relatively little time and materials outlay.

It is a further object of the present invention to provide such a magnetic drive system in which sufficient reset forces after a movement of the armature are effective to return the armature to a rest position without the use of mechanical reset means such as springs.

The above objects are inventively achieved in a magnetic drive system utilizing a single coil which is rigidly connected to the armature for comovement therewith relative to the surrounding yoke with the windings of the coil being disposed such that a force in the longitudinal direction of the armature is generated upon excitation of the coil and wherein the length of the yoke in the longitudinal direction is greater than that portion of the armature in the same direction which consists of low magnetic retentive material.

DESCRIPTION OF THE PREFERRED EMBODIMENTS

Figure 1A:
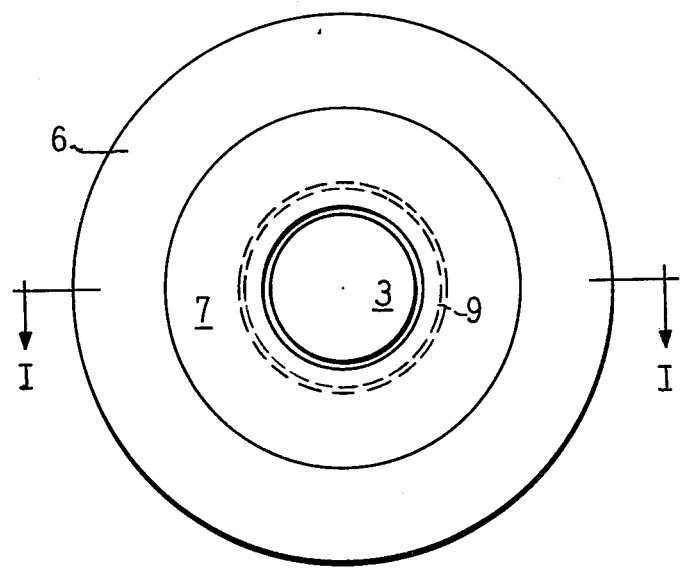
FIG. 1A is a plan view of a magnetic drive system constructed in accordance with the principles of the present invention.
Figure 1:
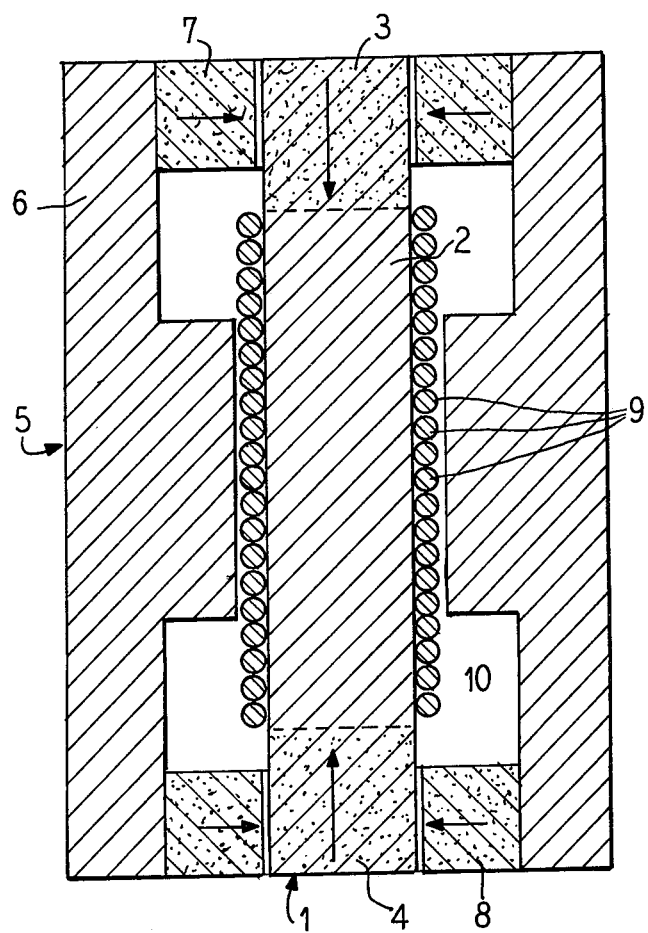
FIG. 1 is a sectional view taken along line I—I of FIG. 1A.

A first embodiment of a magnetic drive system is shown in plan and sectional views in FIG. 1A and FIG. 1. The system includes a bar-shaped armature 1 consisting of a central portion 2 of low magnetic retentive material and having cylindrical end faces 3 and 4 which are permanent magnets. The armature 1 thus consists primarily of low retentive material. The direction of magnetization of the permanent magnets 3 and 4, as well as other magnets identified below, are designated by the arrows.

The armature 1 is seated within a bore in a yoke 5 which completely surrounds the armature 1 and which consists of a central portion 6 consisting of low magnetic retentive material and radially magnetized annular permanent magnets 7 and 8. The cylindrical permanent magnets 3 and 4 of the armature 1 respectively project into the annular permanent magnets 7 and 8. With the directions of magnetization shown in FIG. 1, the magnetic flux enters the armature 1 at the ends thereof and departs from the armature in the radial direction in the central portion 2.

The central portion 2 of the armature 1 carries windings 9 of a coil 10 which is rigidly affixed thereto for longitudinal comovement with the armature 1 within the yoke 5. The coil 10 is connected to a voltage source (not shown).

As a result of magnetization upon each longitudinal movement of the armature from the rest position shown in FIG. 1, the permanent magnets 3 and 4 at the ends of the armature 1 and the permanent magnets 7 and 8 in the yoke 5 combine to exert a force on the armature resisting such longitudinal movement and urging the armature back into the rest position. For the most part, these forces arise because the low magnetic retentive central portion 2 of the armature 1 is shorter in the longitudinal direction than is the yoke 5 surrounding the armature so that upon a longitudinal movement of the armature from the rest position, the flux in that portion of the magnetic circuit consisting of the armature and yoke is increased in the direction of movement of the armature 1. This results in repelling forces between the permanent magnets 7 and 3 predominating in one portion of the armature upon a movement of the armature toward the end of the yoke 5 at which the magnet 7 is mounted, whereas repelling forces between the permanent magnets 4 and 8 predominate upon a longitudinal movement of the armature 1 toward the end of the yoke 5 at which the permanent magnet 8 is mounted.

The central portion 6 of the yoke 5 is of annular design and has a reduced diameter in the area of the coil 10, so that the lines of magnetic flux proceed essentially perpendicular to the direction of the current in the windings 9 of the coil 10. The forces effective between the armature 1 and the yoke 5 are essentially proportional to the current in the coil and are substantially independent of the amount of movement of the armature 1 and the coil 10 relative to the yoke 5. The movement of the armature 1 thus depends substantially only upon the direction of the current in the coil 10.

Figure 2:
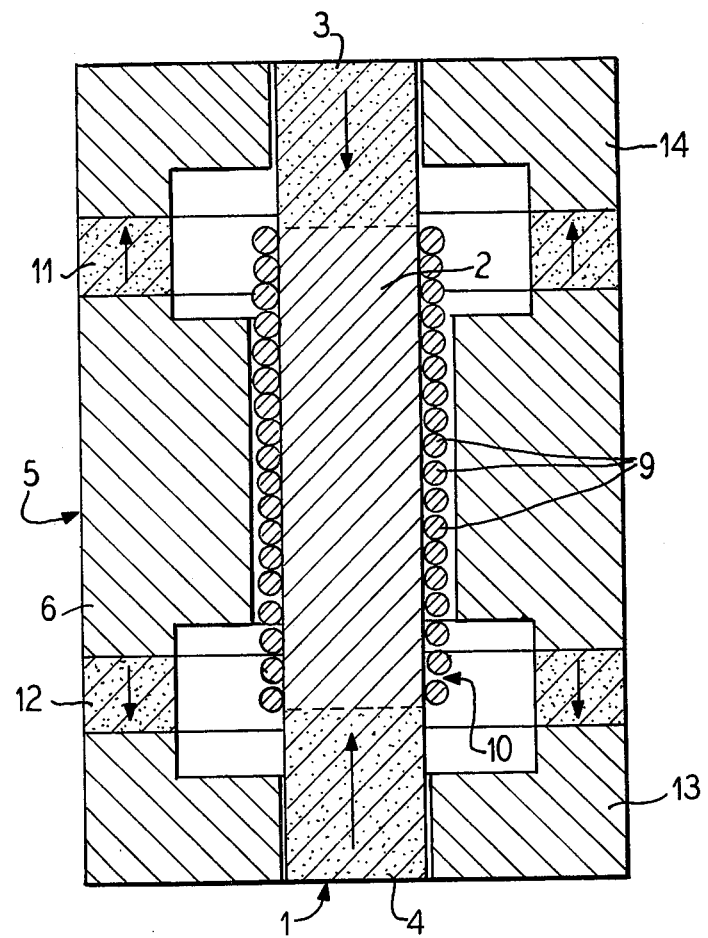
FIG. 2 is a sectional view of a second embodiment of a magnetic drive system constructed in accordance with the principles of the present invention.

A second embodiment of a magnetic drive system constructed in accordance with the principles of the present invention is shown in FIG. 2 by which the use of radially magnetized permanent magnets is foregone. The armature 1 is constructed identically to the armature shown in the embodiment of FIG. 1, however the yoke 5 has two annular permanent magents 11 and 12 which are magnetized in the axial or longitudinal direction which are adjacent to the central portion 6 of the yoke 5. Additional yoke portions 13 and 14 of low magnetic retentiveness serve to conduct the magnetic flux to the proximity of the permanent magnets 3 and 4 carried on the armature 1.

The forces effective in the radial direction of the system must be taken into consideration in order to centrally position the armature 1 relative to the yoke 5. In the embodiment shown in both FIGS. 1 and 2, the lines of force at both ends of the armature 1 enter into one of the permanent magnets 3 or 4 through the air gap, which should be maintained as small as possible. Such permanent magnets have a relatively small permeability, particularly when those magnets consist of high quality permanent-magnetic material such as cobalt and rare earths. The permeability for such magnets is approximately $\mu_r = 1.05$.

Thus with regard to the radial flux distribution of the armature 1, the permanent magnets 3 and 4 behave approximately like air, so that only slight radial forces directed toward the exterior of the system occur and need be compensated by seating of the armature.

Figure 3:
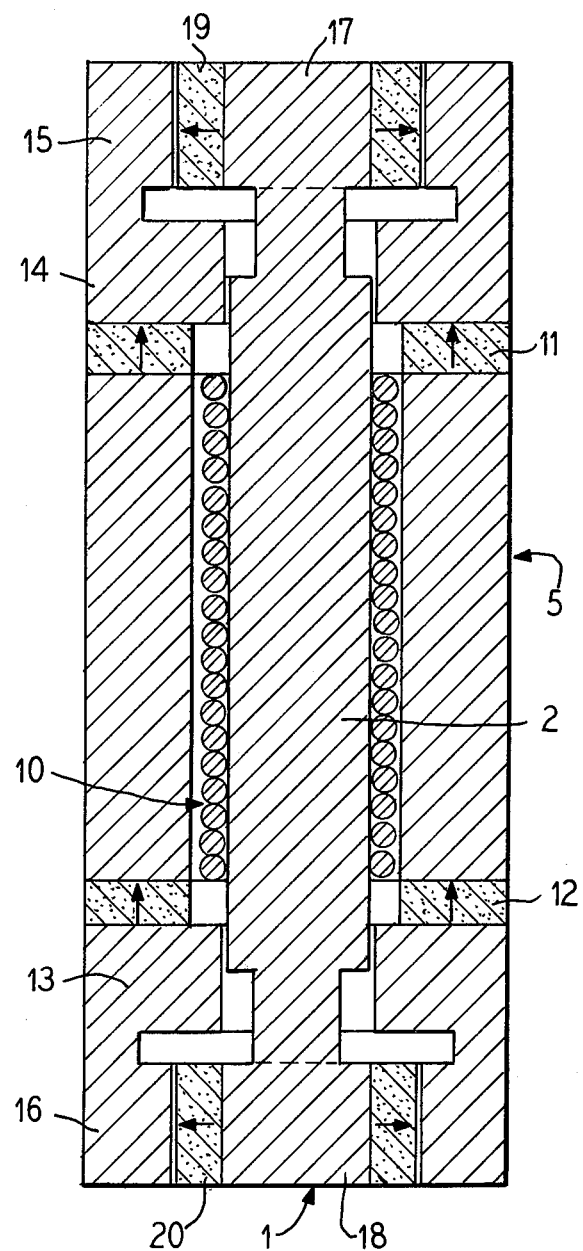
FIG. 3 is a sectional view of a third embodiment of a magnetic drive system constructed with the principles of the present invention.

The third embodiment for the system shown in FIG. 3 has a more simplified structure than the embodiments shown in FIGS. 1 and 2, however, as a trade-off therefor the armature 1 in the embodiment shown in FIG. 3 is more difficult to properly seat in the yoke 5 because the structure of FIG. 3 does not eliminate the radial forces as effectively as the structures shown in FIGS. 1 and 2. In the embodiment shown in FIG. 3, the yoke 5 is constructed similar to that shown in FIG. 2, however, the central portion 6 of the yoke 5 in the embodiment of FIG. 3 consists simply of a cylinder with a longitudinal bore in which the armature 1 with the coil 10 comovably attached thereto is seated. The armature 1 has a central low magnetic retentive portion which, for the purpose of attaining significant reset forces, projects only partially into the central openings of the yoke portions 13 and 14.

The embodiment of FIG. 3, as stated above, has a more simplified construction than the embodiments of FIGS. 1 and 2, but requires a more careful mounting of the armature in the openings of the yoke elements 13 and 14 because, upon a longitudinal movement of the armature 1 out of the central rest position due to the low magnetic retentive material comprising the armature and the yoke, higher forces of movement result. In order to minimize the difficulty in properly seating the armature 1 within the yoke 5, the yoke portions 13 and 14 have respective projections 16 and 15 and the armature 1 has projections 17 and 18 at the ends thereof. The projections 17 and 18 carry respective radially magnetized permanent magnets 19 and 20 so that repulsive forces occur in the air gaps between the extensions 15 and 17 and the extensions 16 and 18. This effect is achieved in the embodiment of FIG. 3 by the use of the radially magnetized annular permanent magnets 19 and 20. The projections 17 and 18 of the armature 1, except for the permanent magnets 19 and 20, consist otherwise of non-magnetic material, so that the functioning of the magnetic drive system due to such seating difficulties is not significantly impaired.

Although modifications and changes may be suggested by those skilled in the art it is the intention of the inventors to embody within the patent warranted hereon all changes and modifications as reasonably and properly come within the scope of their contribution to the art.

We claim as our invention:

1. In a magnetic drive system for generating linear movement having a yoke having a longitudinal bore therein, a bar-shaped armature normally centrally positioned in said bore and seated in said bore for longitudinal movement relative to said yoke, said yoke and said armature consisting primarily of low magnetic retentive material forming a magnetic circuit and at least one permanent magnet disposed in said magnetic circuit effecting a magnetic flux in the armature directed from both ends of the armature to the center thereof or vice versa, the improvement comprising:

a single coil connected to a central portion of said armature for longitudinal comovement therewith relative to said yoke,
said coil being connected to a voltage source for supplying a current flow through said coil for generating a force effective in the longitudinal direction of said armature in said magnetic circuit for moving said armature, and said coil having windings wound about said armature such that the magnetic flux generated by said coil enters and departs from said armature in said longitudinal direction of the armature; and
said yoke having a length in the longitudinal direction which is greater than that portion of the armature in the longitudinal direction consisting of low magnetic retentive material for generating a restorative magnetic force for re-positioning said armature to said central position in said bore after said armature is moved from said central position by said current in said coil.

2. The improvement of claim 1 wherein said armature consists of a central portion consisting of low magnetic retentive material and opposite end faces consisting of cylindrical permanent magnets.

3. The improvement of claim 1 further comprising two axially magnetized annular permanent magnets disposed at opposite ends of said yoke surrounding said armature.

4. The improvement of claim 1 further comprising a pair of permanent magnets carried at opposite ends of said armature and a pair of annular magnets mounted at opposite ends of said yoke surrounding said permanent magnets of said armature.

5. The improvement of claim 1 wherein said coil is wound on said portion of said armature consisting of low magnetic retentive material and is secured thereto and wherein said armature further consists of a pair of permanent magnets disposed at locations of said armature at which magnetic flux generated by said coil enters or departs from said armature.

6. The improvement of claim 1 further comprising a pair of annular permanent magnets mounted in said yoke for magnetization of said magnetic circuit and wherein said armature and said yoke each have projections extending beyond said low magnetic retentive material and wherein said extensions of said armature have permanent magnets respectively mounted thereon for generating a radial flux and wherein said extensions of said yoke surround said extension of said armature and are magnetized such that repulsive magnetic forces are generated in an air gap between said extensions of said yoke and said extensions of said armature.

* * * * *